United States Patent
Boyle et al.

(10) Patent No.: US 6,940,873 B2
(45) Date of Patent: Sep. 6, 2005

(54) DATA STREAM CONTROL SYSTEM FOR ASSOCIATING COUNTER VALUES WITH STORED SELECTED DATA PACKETS FROM AN INCOMING DATA TRANSPORT STREAM TO PRESERVE INTERPACKET TIME INTERVAL INFORMATION

(75) Inventors: William B. Boyle, Lake Forest, CA (US); Ronald G. Parkinen, Lake Forest, CA (US)

(73) Assignees: Keen Personal Technologies, Inc., Irvine, CA (US); Keen Personal Media, Inc.

(*) Notice: Subject to any disclaimer, the term of this patent is extended or adjusted under 35 U.S.C. 154(b) by 986 days.

(21) Appl. No.: 09/751,902

(22) Filed: Dec. 27, 2000

(65) Prior Publication Data

US 2002/0105905 A1 Aug. 8, 2002

(51) Int. Cl.[7] .................................................. H04J 3/06
(52) U.S. Cl. ...................................................... 370/503
(58) Field of Search .......................... 709/231; 370/503, 370/428, 412, 413, 252, 254, 229–231, 389, 509, 510, 512, 514, 465; 348/384.1, 406.1, 423.1, 424.2, 469

(56) References Cited

U.S. PATENT DOCUMENTS

| | | | |
|---|---|---|---|
| 5,467,137 A | 11/1995 | Zdepski | |
| 5,664,116 A | 9/1997 | Gaytan | |
| 5,818,539 A | 10/1998 | Naimpally et al. | |
| 6,021,440 A | 2/2000 | Post et al. | |
| 6,026,506 A | 2/2000 | Anderson et al. | |
| 6,034,731 A | 3/2000 | Hurst, Jr. | |
| 6,061,399 A | 5/2000 | Lyons et al. | |
| 6,088,063 A | 7/2000 | Shiba | |
| 6,297,845 B1 * | 10/2001 | Kuhn et al. | 348/192 |
| 6,310,921 B1 | 10/2001 | Yoshioka et al. | |
| 6,330,286 B1 | 12/2001 | Lyons et al. | |
| 6,650,869 B2 * | 11/2003 | Kelly et al. | 455/13.2 |

* cited by examiner

Primary Examiner—Dang Ton
(74) Attorney, Agent, or Firm—Knobbe Martens Olson & Bear

(57) ABSTRACT

A data stream control system and a method selectively store a series of selected data packets with interpacket time intervals from an incoming data transport stream. The data stream control system includes a programmable data packet filter that transmits the series of selected data packets in response to the packet filter parameter. A counter provides counter values for the selected data packets representing a time of reception for the respective selected data packet. The counter values are stored in association with the respective selected data packets to preserve information regarding the interpacket time intervals. The data stream control system can further include a timing restorer to transmit a stored series of selected data packets with interpacket time intervals which substantially match the corresponding interpacket time intervals of the series of selected data packets.

64 Claims, 10 Drawing Sheets

DATA STREAM CONTROL SYSTEM FOR ASSOCIATING COUNTER VALUES WITH STORED SELECTED DATA PACKETS FROM AN INCOMING DATA TRANSPORT STREAM TO PRESERVE INTERPACKET TIME INTERVAL INFORMATION

BACKGROUND OF THE INVENTION

1. Field of the Invention

The present invention is directed to information storage and display systems utilizing storage devices, and more particularly, to video recording systems that store and playback streaming video data packets.

2. Description of the Related Art

Audiovisual information is advantageously compressed by audiovisual data storage systems, thereby expressing the information by using less data. Compression reduces the amount of storage needed for a given amount of source material, and it reduces the bandwidth needed for the transfer of the data. One standard for audiovisual compression is MPEG (Moving Picture Experts Group) compression which was developed by a joint technical committee of the International Organization for Standardization (ISO) and the International Electrotechnical Commission (IEC). The MPEG compression standard is outlined in "Information Technology: Generic Coding of Moving Pictures and Associated Audio Information: Systems," International Standard ISO/IEC 13818-1:1996 (E), which is incorporated by reference herein.

For the transmission of audiovisual programming, various programs transmitted from the outputs of various MPEG encoders are multiplexed together into a transport stream, the transport stream comprising multiple series of fixed-size data packets, along with metadata which describes the transport stream. Each data packet comprises a header and a payload. The header contains various information regarding the data packet, including the packet identifier code (PID) which identifies the program or data to which the data packet belongs. The metadata includes a program association table (PAT) that lists the various programs comprising the transport stream and points to a program map table (PMT) that lists the corresponding data packets. The metadata can also include conditional access information (i.e., encryption).

The different series of data packets of the transport stream are generally generated by different MPEG encoders, which typically have different compression factors and different system time clocks (STCs). The different system time clocks generally are not synchronized to one another. In changing from one program to the next, an MPEG decoder synchronizes its STC with the STC which was used during the encoding of each program. This synchronization avoids jitter in the decoded data stream, and avoids overrun or underrun of the memory buffers of the MPEG decoder. To provide the synchronization data needed to decode a series of data packets, the data packets are encoded with program clock reference (PCR) information.

During the encoding of audiovisual data, a fixed-frequency (e.g., 27 MHz) STC of an MPEG encoder drives a constantly running binary counter, the value of which is sampled periodically and placed in the data packet headers as PCR information. At the decoder, the PCR value of a data packet is compared with a local PCR value which is driven by a STC with nominally the same frequency. The difference in these PCR values (the PCR phase error) thereby allows the MPEG decoder to properly synchronize its STC to the STC of the MPEG encoder for the selected series of data packets, thereby duplicating the same frame rate used at the MPEG encoder with the frame rate generated at the MPEG decoder. Note that because the timing of the presentation of these PCR values at the MPEG decoder is critical for the MPEG decoder to operate correctly, this PCR method relies on the MPEG decoder receiving the series of data packets for a particular program with the same interpacket time intervals as the series of data packets had when they were transmitted from the MPEG encoder.

U.S. Pat. No. 5,467,137 issued to Zdepski, which is incorporated by reference herein, addresses the problem of varying transmission times among a series of data packets being transmitted across a system such as the Internet. Zdepski discloses an apparatus and method for providing synchronization for a transmitted multilayered compressed video signal by inserting auxiliary transport packets which include modifiable differential time codes or count values. These differential count values are used to account for the incremental delays the transport packets incur during the signal forming/transmission process.

SUMMARY OF THE INVENTION

The present invention may be regarded as a data stream control system connectable to a storage device, the data stream control system selectively storing a series of selected data packets from an incoming data transport stream. A transport stream input interface receives the incoming data transport stream comprising selected data packets having interpacket time intervals between the selected data packets. A command interface receives at least one packet filter parameter identifying the series of selected data packets. A programmable data packet filter is coupled to the command interface and transport stream input interface and transmits the series of selected data packets in response to the packet filter parameter and the incoming data transport stream. A storage interface is coupled to the programmable data packet filter and is connectable to the storage device. The storage interface transmits the selected data packets to the storage device. A counter provides counter values for the selected data packets. Each counter value represents a time of reception of a respective selected data packet. The counter value is stored in association with the respective selected data packet to preserve information regarding the interpacket time intervals of the series of selected data packets from the incoming data transport stream.

The present invention may also be regarded as a data storage system that selectively stores a series of selected data packets from an incoming data transport stream and that plays back and transmits the stored series of selected data packets to an outgoing data transport stream. A data storage system controller generates at least one packet filter parameter in response to user input. The at least one packet filter parameter identifies the series of selected data packets. A transport stream input interface receives the incoming data transport stream comprising selected data packets having interpacket time intervals between the selected data packets. A command interface receives the at least one packet filter parameter from the data storage system controller. A programmable data packet filter is coupled to the command interface and transport stream input interface and transmits the series of selected data packets in response to the packet filter parameter and the incoming data transport stream. A storage device stores the selected data packets. A storage interface is coupled to the programmable data packet filter and to the storage device and transmits the selected data packets to the storage device and receives stored selected data packets from the storage device. A counter provides counter values for the selected data packets. Each counter value represents a time of reception of a respective selected data packet. The counter value is stored in association with the respective selected data packet to preserve information regarding the interpacket time intervals of the series of selected data packets from the incoming data transport stream. A timing restorer receives the stored selected data packets from the storage interface and receives the counter values stored in association with the respective selected data packets. The timing restorer transmits the stored selected data packet at a time of transmission responsive to the respective counter value. A transport stream output interface is coupled to the timing restorer and the outgoing data transport stream. The transport stream output interface receives the stored series of selected data packets from the timing restorer. The outgoing data transport stream receives the stored series of selected data packets from the transport stream output interface with interpacket time intervals which substantially match the corresponding interpacket time intervals of the series of selected data packets from the incoming data transport stream.

The present invention may also be regarded as a method of selectively storing a series of selected data packets from an incoming data transport stream. The series of selected data packets has interpacket time intervals between the selected data packets. The method comprises receiving at least one packet filter parameter identifying the series of selected data packets. The method further comprises receiving the incoming data transport stream. The method further comprises storing the series of selected data packets in response to the packet filter parameter and the incoming data transport stream. The method further comprises providing counter values for the selected data packets. Each counter value represents a time of reception of a respective selected data packet. The method further comprises storing the counter value in association with the respective selected data packet, thereby preserving information regarding the interpacket time intervals of the series of selected data packets from the incoming data transport stream.

The present invention may also be regarded as a method of selectively storing and playing back a series of selected data packets from an incoming data transport stream. The series of selected data packets has interpacket time intervals between the selected data packets. The method comprises receiving at least one packet filter parameter identifying the series of selected data packets. The method further comprises receiving the incoming data transport stream. The method further comprises storing the series of selected data packets in response to the packet filter parameter and the incoming data transport stream. The method further comprises providing counter values for the selected data packets. Each counter value represents a time of reception of a respective selected data packet. The method further comprises storing the counter value in association with the respective selected data packet, thereby preserving information regarding the interpacket time intervals of the series of selected data packets from the incoming data transport stream. The method further comprises playing back the stored selected data packets. The method further comprises receiving the counter value stored in association with the respective selected data packets. The method further comprises transmitting the stored selected data packet at a time of transmission responsive to the respective counter value. The stored series of selected data packets are transmitted with interpacket time intervals which substantially match the corresponding interpacket time intervals of the series of selected data packets from the incoming data transport stream.

DETAILED DESCRIPTION OF THE EMBODIMENT

Figure 1:
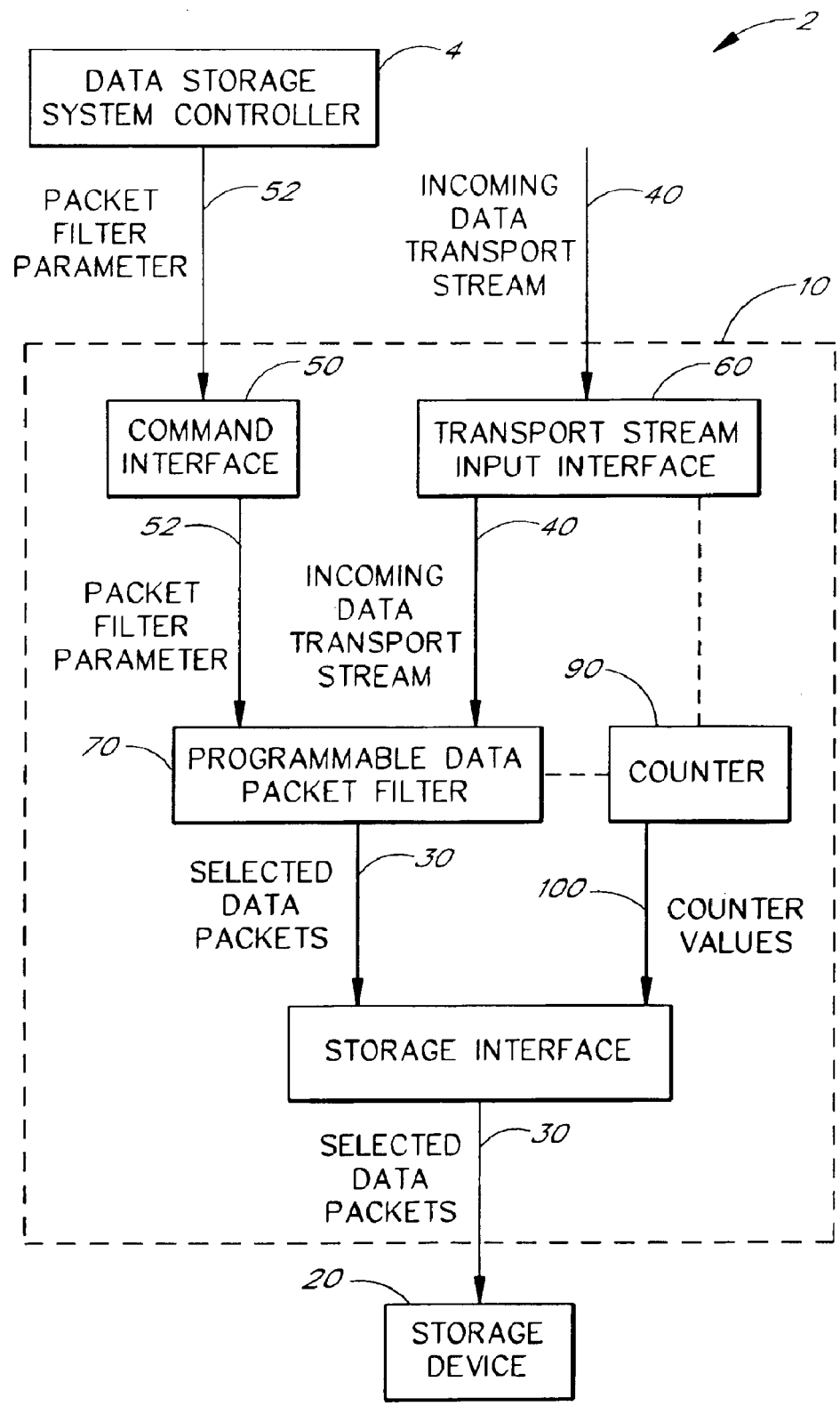
FIG. 1 schematically illustrates a data storage system comprising a data stream control system in accordance with an embodiment of the present invention.

FIG. 1 schematically illustrates a data storage system 2 comprising a data stream control system 10 in accordance with an embodiment of the present invention. The data stream control system 10 is connectable to a storage device 20 and selectively stores a series of selected data packets 30 from an incoming data transport stream 40. The data stream control system 10 comprises a transport stream input interface 60 that receives the incoming data transport stream 40 that has interpacket time intervals between the selected data packets 30. The data stream control system 10 further comprises a command interface 50 that receives the at least one packet filter parameter 52 identifying the series of selected data packets 30. The data stream control system 10 further comprises a programmable data packet filter 70 coupled to the command interface 50 and transport stream input interface 60. The programmable data packet filter 70 transmits the series of selected data packets 30 in response to the packet filter parameter 52 and the incoming data transport stream 40. The data stream control system 10 further comprises a storage interface 80 coupled to the programmable data packet filter 70 and connectable to the storage device 20. The storage interface 80 transmits the selected data packets 30 to the storage device 20. The data stream control system 10 further comprises a counter 90 that provides counter values 100 for the selected data packets 30.

Each counter value 100 represents a time of reception of a respective selected data packet 30. The counter value 100 is stored in association with the respective selected data packet 30 to preserve information regarding the interpacket time intervals of the series of selected data packets 30 from the incoming data transport stream 40. The data storage system 2 comprises a data storage system controller 4 that generates the at least one packet filter parameter 52 identifying the series of selected data packets 30.

In certain embodiments of the present invention, the data stream control system 10 is a portion of a data storage system 2 such as a personal video recorder (PVR). In these embodiments, the data stream control system 10 can be realized as an application-specific integrated circuit (ASIC) coupled to other components of the PVR 2. Persons skilled in the art appreciate, however, that the data stream control system 10 described herein can also be realized as multiple separate components of the PVR 2. Only the portions of the PVR 2 pertinent to the present invention are illustrated in FIG. 1 and the other figures. One skilled in the art will appreciate that an exemplary PVR 2 has other elements (not shown) that implement other features of the PVR 2. An exemplary PVR 2 is disclosed in copending U.S. patent application Ser. No. 09/585,249, filed May 31, 2000, entitled "Digital Video Recorder Connectable To An Auxiliary Interface Of A Set-Top Box That Provides Video Data Stream To A Display Device Based On Selection Between Recorded Video Signal Received From The Digital Video Recorder And A Real-Time Video Signal," which is incorporated by reference herein. Also, in other embodiments, the data stream control system 10 can be a portion of other types of data storage systems, such as personal computers or video camera systems.

The data stream control system 10 is connectable to a storage device 20 which selectively stores a series of selected data packets 30 from an incoming data transport stream 40. In addition, the storage device 20 can provide storage for various types of system information. In certain embodiments of the present invention, the storage device 20 comprises a hard disk drive compatible with a version of the ATA (AT-attachment) standard, such as IDE (Integrated Drive Electronics). In other embodiments, the storage device 20 comprises a hard disk drive compatible with the SCSI (Small Computer System Interface) standard. In still other embodiments, the storage device 20 comprises a hard disk drive compatible with the IEEE 1394 standard, which is described in the "IEEE Std 1394–1995 IEEE Standard for a High Performance Serial Bus," Aug. 30, 1996, which is incorporated by reference herein. A storage device 20 compatible with the present invention can utilize any technology that provides writable non-volatile storage (e.g., a writable digital video disk (DVD) drive).

In an embodiment in which the data stream control system 10 is a portion of a PVR 2, the incoming data transport stream 40 is typically generated by a video input interface in response to an external video data stream received from a video data service provider that supplies video programming to multiple users. Examples of such video data service providers include, but are not limited to, cable television systems and satellite systems. Alternatively, the external video data stream can be received from UHF or VHF broadcast signals using an antenna. The incoming data transport stream 40 is generated by the video input interface with a format which is compatible with the other components of the data storage system. For example, in certain embodiments, to provide compatibility of the PVR 2 with an analog-formatted external video data stream, the video input interface of certain embodiments comprises an MPEG (Motion Pictures Experts Group) encoder, which generates an incoming data transport stream 40 comprising MPEG-encoded data packets in response to the analog-formatted external video data stream. Alternatively, in other embodiments, the external video data stream itself comprises MPEG-encoded data packets thereby serving as the incoming data transport stream 40, which is then transmitted to the data stream control system 10 by the video input interface. Furthermore, for particular embodiments that are compatible with an encrypted external video data stream (e.g., video data streams from premium cable channels), the PVR 2 can also comprise a decrypter, typically as a component of the video input interface.

The transport stream input interface 60 receives the incoming data transport stream 40 for the data stream control system 10 and transmits the incoming data transport stream 40 to the programmable data packet filter 70. Persons skilled in the art are able to provide a video input interface and a transport stream input interface 60 that are compatible with the present invention. Note that while the following discussion focuses on certain embodiments in which the incoming data transfer stream 40 is MPEG-encoded, other embodiments compatible with the present invention can utilize incoming data transport streams 40 conforming to other selected compression standards.

In an embodiment in which the data stream control system 10 is a portion of a PVR 2, the packet filter parameter 52 is typically generated by a system controller in response to user input and/or electronic program guide (EPG) information. A user provides user input to the PVR to select which video program segments are stored from the incoming data transfer stream 40, as well as to control various other operation parameters of the PVR 2, such as playback commands (e.g., pause, instant-replay, etc.). The incoming data transport stream 40 comprises selected data packets 30 corresponding to the video program segments selected to be stored, and non-selected data packets corresponding to the portion of the incoming data transport stream 40 not selected for storing. The EPG information is a database, typically displayed to the user in the form of a program grid, containing information regarding the programs and broadcast schedules from various broadcast channels. The user input, in conjunction with the EPG information, is used by the system controller to generate at least one packet filter parameter 52 which indicates the series of selected data packets 30 corresponding to the video program segment selected for storing. The packet filter parameter 52 is then transmitted to the command interface 50 of the data stream control system 10.

In embodiments in which the incoming data transport stream 40 comprises multiple series of MPEG-encoded data packets, the packet filter parameter 52 comprises the packet identifier code (PID) which is contained in the header of each selected data packet 30. Each MPEG-encoded data packet contains 188 bytes, comprising a header with a minimum size of 4 bytes, and a payload which comprises the encoded data. The header comprises the PID and the program clock reference (PCR) for the particular data packet. As described above, an MPEG decoder relies on the PCR value to properly synchronize its system time clock (STC) to the STC of the MPEG encoder. Under the MPEG encoding standard, in a given transport stream, MPEG-encoded data packets belonging to a given elementary stream (i.e., generated by the same MPEG encoder) will have the same PID. Packets in another elementary stream will have another PID. In this way, a decoder or demultiplexer can select the elementary stream it wants from a transport stream and reject the remainder. Under the MPEG standard, the PID is a thirteen-bit code which distinguishes the various data packets. For example, null data packets all have the same PID, which is 8191, or thirteen 1's. Persons skilled in the art appreciate that other encoding or compression standards with other packet identification means are compatible with the present invention.

Figure 2:
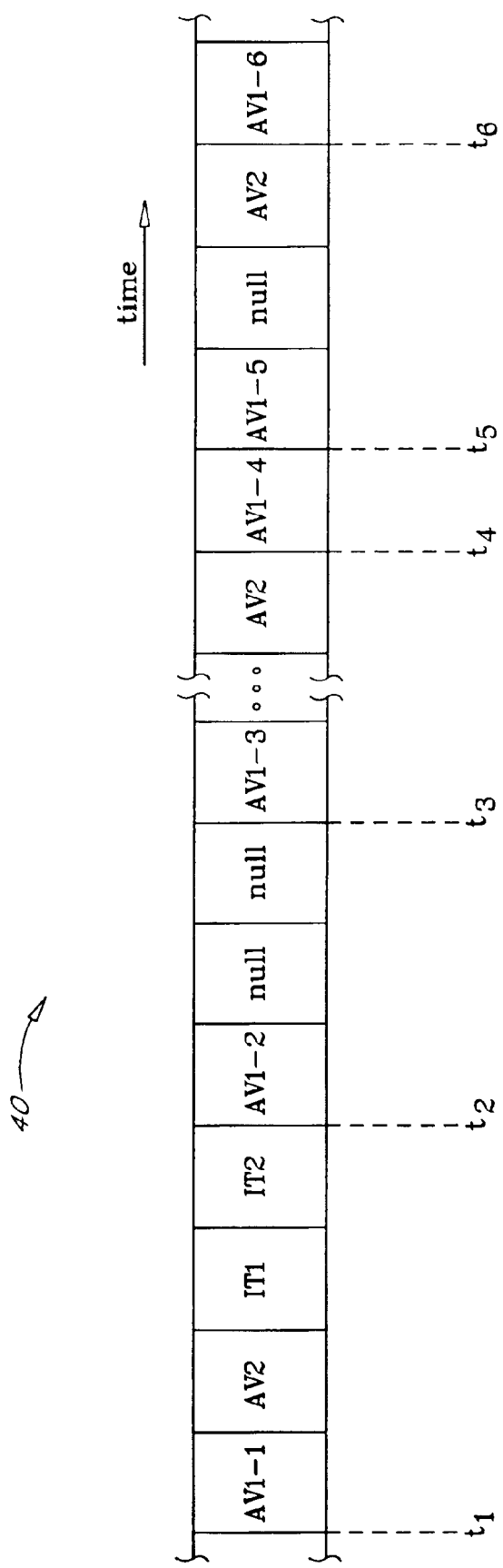
FIG. 2 is a timing diagram of one embodiment of an MPEG-encoded incoming data transport stream.

FIG. 2 is a timing diagram of one possible embodiment of an MPEG-encoded incoming data transport stream 40 comprising audiovisual (AV) program data segments AV1 and AV2, information technology (IT) data segments IT1 and IT2, and null data packets. Null data packets are typically part of an incoming data transport stream 40 in which the full bandwidth of the incoming data transport stream 40 is not being utilized by the video data streams being transmitted. As a result, an incoming data transport stream 40 which contains video data streams being transmitted with reduced resolution, and hence requiring less bandwidth, will generally incorporate more null data packets. The horizontal axis of FIG. 2 corresponds to time, with increasing elapsed time from left to right. In the following discussion, the series of AV1 data packets (AV1-1, AV1-2, . . . ) represents the series of selected data packets 30 corresponding to the video program segment selected for storing to better illustrate the operation of the data stream control system 10. The AV1 series of selected data packets 30 has interpacket time intervals between the various AV1 data packets. Under one convention of expressing the interpacket time intervals, an interpacket time interval is defined as the time interval between the time of reception of the sync reference of a first selected data packet and the time of reception of the sync reference of a second selected data packet. Typically, the sync reference is the first byte of each data packet; however, any portion of the data packets may be selected as the sync reference as long as the selection is consistent for all data packets. For example, the interpacket time interval between selected data packets AV1-1 and AV1-2 is $(t_2-t_1)$, where $t_1$ and $t_2$ are the times of reception of the sync references of the AV1-1 and AV1-2 selected data packets, respectively.

As seen in FIG. 2, these interpacket time intervals comprise one selected data packet, non-selected data packets (i.e., AV2, IT1, IT2, null) and/or time periods with no data packets (denoted in FIG. 2 as an ellipsis). For example, the interpacket time interval between times $t_1$ and $t_2$ comprises the AV1-1 selected data packet and the AV2, IT1, and IT2 non-selected data packets. The interpacket time interval between times $t_3$ and $t_4$ comprises the AV1-3 selected data packet, an AV2 non-selected data packet, and a time period with no data packets. Note that for selected data packets which immediately precede one another (e.g., selected data packets AV1-4 and AV1-5), the corresponding interpacket time interval between times $t_4$ and $t_5$ comprises one selected data packet (e.g., AV1-4). Accordingly, another convention can express the interpacket time intervals in terms of a number of non-selected data packets interposed between a first selected data packet and a second selected data packet. For example, the interpacket time interval between times $t_1$, and $t_2$ can be expressed as three non-selected data packets, and the interpacket time interval between times $t_4$ and $t_5$ can be expressed as zero. Persons skilled in the art appreciate that various conventions for expressing the interpacket time intervals are compatible with the present invention.

The incoming data transport stream 40 and the packet filter parameter 52 are received by the programmable data packet filter 70, which transmits the series of selected data packets 30 in response to the packet filter parameter 52 and the incoming data transport stream 40. For the incoming data transport stream 40 illustrated in FIG. 2, the programmable data packet filter 70 receives the selected data packets 30 (i.e., AV1-1, AV1-2, . . . ) at times $t_1$, $t_2$, . . . and the interpacket time intervals between the selected data packets 30 comprise the non-selected data packets. In certain embodiments, the programmable data packet filter 70 comprises a demultiplexer which transmits the series of selected data packets 30 to the storage interface 80, but does not transmit the non-selected data packets. For the incoming data transport stream 40 illustrated in FIG. 2, the programmable data packet filter 70 transmits the AV1 series of selected data packets 30 but does not transmit the AV2, IT1, IT2, or null data packets. Furthermore, in certain embodiments as described below, the programmable data packet filter 70 detects non-selected data packets and generates a corresponding signal.

The storage interface 80 is coupled to the programmable data packet filter 70 and is connectable to the storage device 20. The storage interface 80 transmits the selected data packets 30 to the storage device 20. As is more fully described in the following discussion of various embodiments, the storage interface 80 can comprise various memory buffers to facilitate the transfer of selected data packets and other information between the data stream control system 10 and the storage device 20. In certain embodiments, the storage interface 80 can also be coupled to other memory buffers (e.g., random-access memory (RAM)) to store various information such as the counter values 100. Persons skilled in the art are able to provide a storage interface 80 compatible with the present invention.

The counter 90 provides counter values 100 for the selected data packets 30. Each counter value 100 represents a time of reception of a respective selected data packet 30. In one embodiment, the time of reception of a data packet is a time at which the data packet is received by the programmable data packet filter 70. In other embodiments, the time of reception can be the time at which the data packet is received by another component of the data storage system 2, as long as the time of reception is consistently defined for all data packets. As is more fully described in the following discussion of various embodiments, the counter values 100 can represent the times of reception of the selected data packets 30 in numerous forms. In addition, in these various embodiments, the counter 90 can be coupled with various other components of the data stream control system 10 in order to provide counter values 100 compatible with the present invention. As illustrated in FIG. 1, two of these optional couplings are represented by the dashed line between the counter 90 and the programmable data packet filter 70 and the dashed line between the counter 90 and the transport stream input interface 60. Persons skilled in the art appreciate that other embodiments can utilize alternative couplings of the counter 90 which are compatible with the present invention.

The counter values 100 are stored in association with the respective selected data packets 30 to preserve information regarding the interpacket time intervals of the series of selected data packets 30 from the incoming data transport stream 40. As is described more fully below, certain embodiments can append the counter values 100 to the selected data packets 30, storing both on the storage device 20. Alternatively, in other embodiments, the counter values 100 can be stored on a memory buffer separate from the storage drive 20 in a memory location indexed to the respective selected data packet 30.

Figure 3:
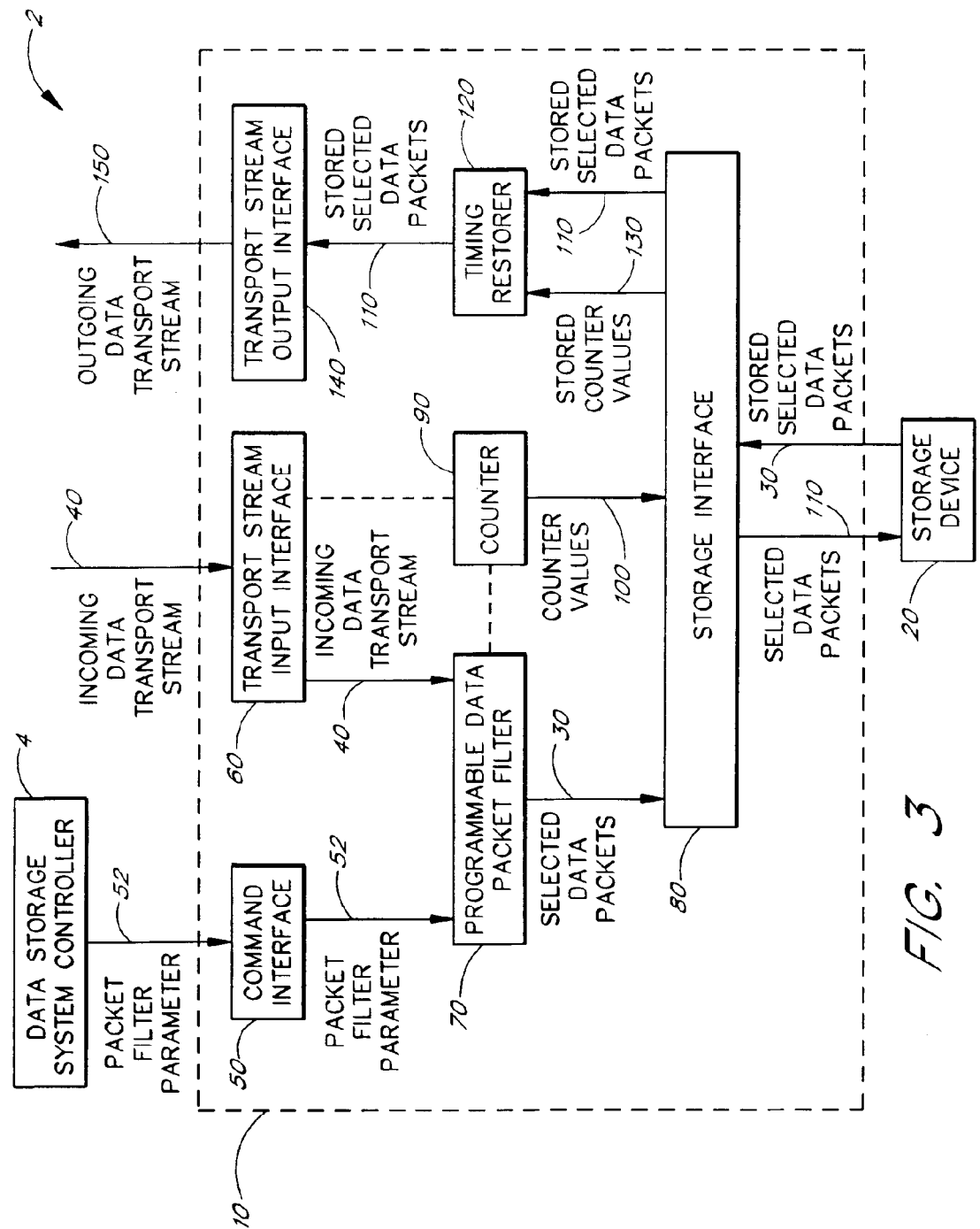
FIG. 3 schematically illustrates a data storage system comprising a data stream control system in accordance with another embodiment of the present invention.

FIG. 3 schematically illustrates a data storage system 2 comprising an embodiment of the data stream control system 10 in which the storage interface 80 receives stored selected data packets 110 from the storage device 20, and the storage device 20 plays back and transmits the stored series of selected data packets 110. In this embodiment, the data stream control system 10 further comprises a timing restorer 120 that receives the stored selected data packets 110 from the storage interface 80 and that receives the counter value 130 stored in association with the respective selected data packets 110. The timing restorer 120 transmits the stored selected data packet 110 at a time of transmission responsive to the respective counter value 130. The data stream control system 10 illustrated in FIG. 3 further comprises a transport stream output interface 140 coupled to the timing restorer 120 and an outgoing data transport stream 150. The transport stream output interface 140 receives the stored series of selected data packets 110 from the timing restorer 120 and transmits the stored series of selected data packets 110 to the outgoing data transport stream 150. The stored series of selected data packets 110 transmitted to the outgoing data transport stream 150 has interpacket time intervals which substantially match the corresponding interpacket time intervals of the series of selected data packets from the incoming data transport stream.

As is described more fully in the following discussion of various embodiments, various configurations of the timing restorer 120 can utilize the stored counter values 130 to substantially match the interpacket time intervals of the corresponding series of selected data packets. In certain embodiments, by transmitting a stored selected data packet 110 in response to the respective stored counter value 130, the timing restorer 120 can substantially restore the interpacket time intervals which existed between the corresponding selected data packets 30 as they were received by the programmable data packet filter 70. Alternatively, in other embodiments, the timing restorer 120 can substantially restore the interpacket time intervals by inserting null data packets between the stored selected data packets 110 in response to the respective stored counter value 130. In the various embodiments, the interpacket time intervals of the series of selected data packets 30 are substantially matched or restored when the stored selected data packets 110 have interpacket time intervals which match the interpacket time intervals of the corresponding selected data packets 30 to within approximately one clock cycle.

The transport stream output interface 140 receives the stored series of selected data packets 110 with interpacket time intervals which substantially match those of the corresponding series of selected data packets and transmits the stored series of selected data packets 110 to the outgoing data transport stream 150. In certain embodiments in which the data stream control system 10 is a portion of a PVR, the outgoing data transport stream 150 transmitted from the data stream control system 10 is received by an MPEG decoder which in response generates an audiovisual data stream which is displayed on a display device, such as a television. In this way, the data stream control system 10 enables a PVR user to view a previously stored video data segment. Persons skilled in the art are able to provide a transport stream output interface 140 that is compatible with the present invention.

As described above, MPEG decoding requires that the interpacket time intervals of the series of selected data packets 30 be preserved because an MPEG decoder utilizes the PCR values of the selected data packet 30 to synchronize its STC with the STC of the MPEG encoder. Normally, when a series of selected data packets 30 from an incoming data transport stream 40 is stored on a storage device 20, the selected data packets 30 are collected in a memory buffer and then burst out to the media within the storage device 20. This procedure removes any information regarding the interpacket time intervals of the series of selected data packets 30 that was present in the incoming data transport stream 40. Consequently, the PCR timing for MPEG encoding and decoding is therefore compromised. However, by storing the counter values 100 representing the times of reception in association with the selected data packets 30, the data stream control system 10 compatible with the present invention preserves information regarding the interpacket time intervals of the series of selected data packets 30 from the incoming data transport stream 40. Also, by not storing the non-selected data packets and the time periods without data packets, this use of counter values 100 stored in association with the selected data packet 30 can further reduce the total amount of storage space required. Persons skilled in the art recognize that in certain embodiments, this preservation of information regarding the interpacket time interval can find utility with data streams which are encoded according to other selected compression standards.

Figure 4:
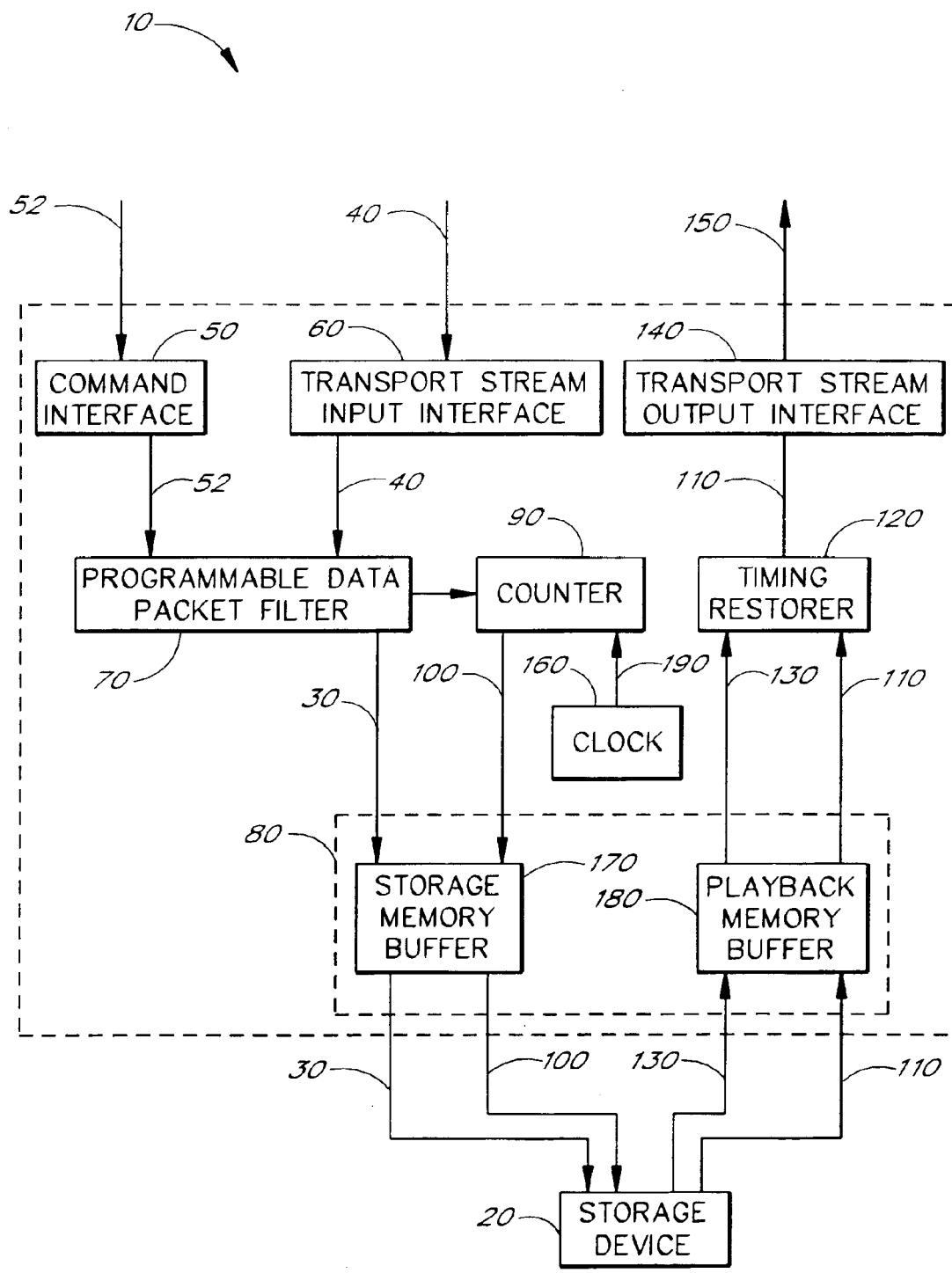
FIG. 4 schematically illustrates a data stream control system in accordance with an embodiment of the present invention, in which the counter is synchronized to a clock that provides time information.

In the embodiment of the data stream control system 10 illustrated in FIG. 4, the data stream control system 10 further comprises a clock 160, and the storage interface 80 further comprises a storage memory buffer 170 and a playback memory buffer 180. The clock 160 is coupled to the counter 90 and provides time information in the form of a clock value 190. In this way, the counter 90 is synchronized to the clock 160. In addition, the counter 90 of the embodiment illustrated in FIG. 4 is coupled to the programmable data packet filter 70. Note that in alternative embodiments, the counter 90 need not be coupled to the programmable data packet filter 70. The clock 160 illustrated in FIG. 4 is a separate component of the data stream control system 10; however, in other embodiments, the clock 160 can be a sub-component of the counter 90, system controller, or other component of the data stream control system 10. In certain other embodiments, the clock 160 can be external to the data stream control system 10.

The programmed data packet filter 70 of the embodiment illustrated in FIG. 4 sends a signal to the counter 90 upon receiving a selected data packet 30. In response to this signal, the counter 90 determines the time of reception by the programmed data packet filter 70 of the selected data packet 30 by noting the clock value 190 from the clock 160. As described below, different embodiments of the present invention can express this time of reception of the selected data packet 30 in different forms.

In certain embodiments, the counter value 100 corresponding to the selected data packet 30 represents a time interval expressed as an absolute clock value 190 in relation to a reference time, such as the time $t_0$ of a previous reset of the clock 160. For example, referring to FIG. 2, the time of reception $t_1$ by the programmable data packet filter 70 of the selected AV1-1 data packet would be represented by a counter value of $(t_1-t_0)$, the time of reception $t_2$ by the programmable data packet filter 70 of the selected AV1-2 data packet would be represented by a counter value of $(t_2-t_0)$, and so on. The selected data packet 30 and its associated counter value 100 are then transmitted by the programmable data packet filter 70 and the counter 90 to the storage memory buffer 170.

Alternatively, in other embodiments, the counter value 100 corresponding to the selected data packet 30 represents a time interval expressed as a differential clock value 190 in relation to a reference time, such as the time of reception of an earlier selected data packet 30. For example, referring to FIG. 2, where the reference time is the time of reception $t_1$ of the selected AV1-1 data packet, the selected AV1-1 data packet would be associated with a counter value of $(t_1-t_1)=0$, the selected AV1-2 data packet detected at $t_2$ would be associated with a counter value of $(t_2-t_1)$, the selected AV1-3 data packet detected at $t_3$ would be associated with a counter value of $(t_3-t_1)$, and so on. Where the reference time is the time of reception of the immediately preceding selected data packet 30, the selected AV1-2 data packet would be associated with a counter value of $(t_2-t_1)$, the selected AV1-3 data packet detected at $t_3$ would be associated with a counter value of $(t_3-t_2)$, and so on. The selected data packet 30 and its associated counter value 100 are then transmitted by the programmable data packet filter 70 and the counter 90 to the storage memory buffer 170.

Note that where a second selected data packet immediately follows another with no intervening time or non-selected data packets (e.g., selected data packets AV1-4 and AV1-5 in FIG. 2), the interpacket time interval is the time corresponding to a single selected data packet. In certain embodiments of the present invention, this time corresponding to a single selected data packet can be implicit in the counter values, so that the corresponding counter value can be expressed as zero. Alternatively, in other embodiments of the present invention, the second of these selected data packets may not have a counter value associated with it. Instead, a flag or other form of indication may be used to denote two adjacent selected data packets with no intervening time or non-selected data packets. Persons skilled in the art will appreciate that such an embodiment is compatible with the present invention.

The storage memory buffer 170 continuously transfers selected data packets 30 from the data stream control system 10 to the storage device 20. Similarly, the playback memory buffer 180 continuously transfers stored selected data packets 110 from the storage device 20 to the data stream control system 10. Data streaming rates for continuously streaming video data (e.g., 1 Mb/s) are typically much lower than the instantaneous data transfer rates for transferring data packets from storage devices 20 comprising hard disk drives (e.g., 66 Mb/s). The storage memory buffer 170 and the playback memory buffer 180 thus serve as temporary repositories of selected data packets in order to maintain a data streaming rate that is lower than the instantaneous data transfer rate of the storage device 20. Similar memory buffers are described in U.S. patent application Ser. No. 09/628,583, filed Jul. 31, 2000, entitled "Video Recording System Utilizing Host-Processor-Resident Error Recovery To Transfer Non-Time-Critical, Error-Intolerant Data Segments While Transferring Time-Critical, Error-Tolerant Streaming Data Segments At A Required Data Transfer Rate," which is incorporated by reference herein.

Figure 5:
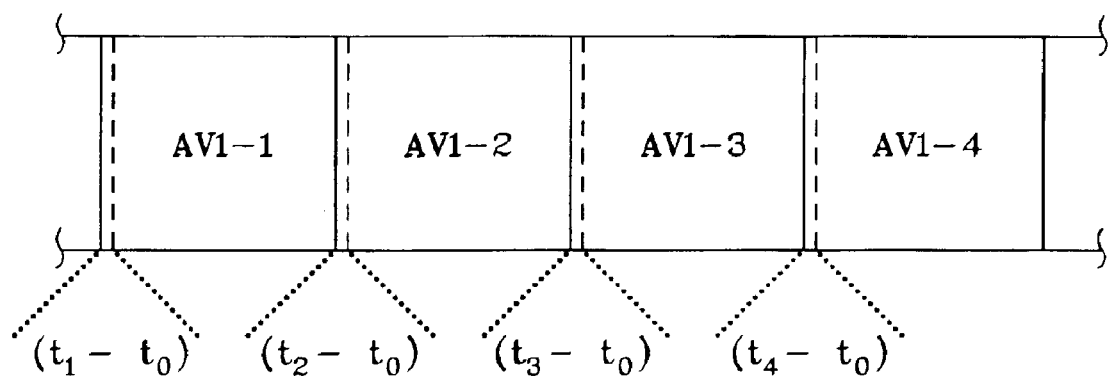
FIG. 5 schematically illustrates an exemplary series of selected data packets stored on the storage device.

From the storage memory buffer 170, the selected data packets 30 are transmitted to the storage device 20, where they are stored for playback upon appropriate commands from the data stream control system 10. In addition, the corresponding counter values 100 are directed by the storage interface 80 to be stored in association with the selected data packets 30. In the embodiment of the data stream control system 10 illustrated in FIG. 4, the selected data packets 30 and the respective counter values 100 are both transmitted to the storage device 20. A storage interface 80 compatible with this embodiment can comprise a multiplexer to combine the selected data packets 30 with the respective counter values 100 which are both then stored on the storage device 20. In certain embodiments compatible with MPEG-encoded selected data packets 30, an MPEG-encoded selected data packet is appended with a corresponding counter value representing the time of reception of the selected data packet, and both the selected data packet and the counter value are stored on the storage device 20. FIG. 5 schematically illustrates an exemplary series of selected data packets 110 stored with the corresponding counter values 130 by the storage device 20, the selected data packets corresponding to the video program segment AV1 of FIG. 2. In certain embodiments of the present invention, the counter value 130 is a 4-byte value appended to the front end of the 188-byte selected data packet 110. FIG. 5 illustrates an embodiment in which the counter value 130 stored with the stored selected data packet 110 is expressed as an absolute clock value 190 in relation to a reference time to, although other embodiments are also compatible with the present invention. Note that embodiments which store the counter values 130 on a memory buffer or RAM at a memory location indexed to the respective stored selected data packet 110, and not with the respective stored selected data packets 110 on the storage device 20, are also compatible with the present invention.

Figure 6:
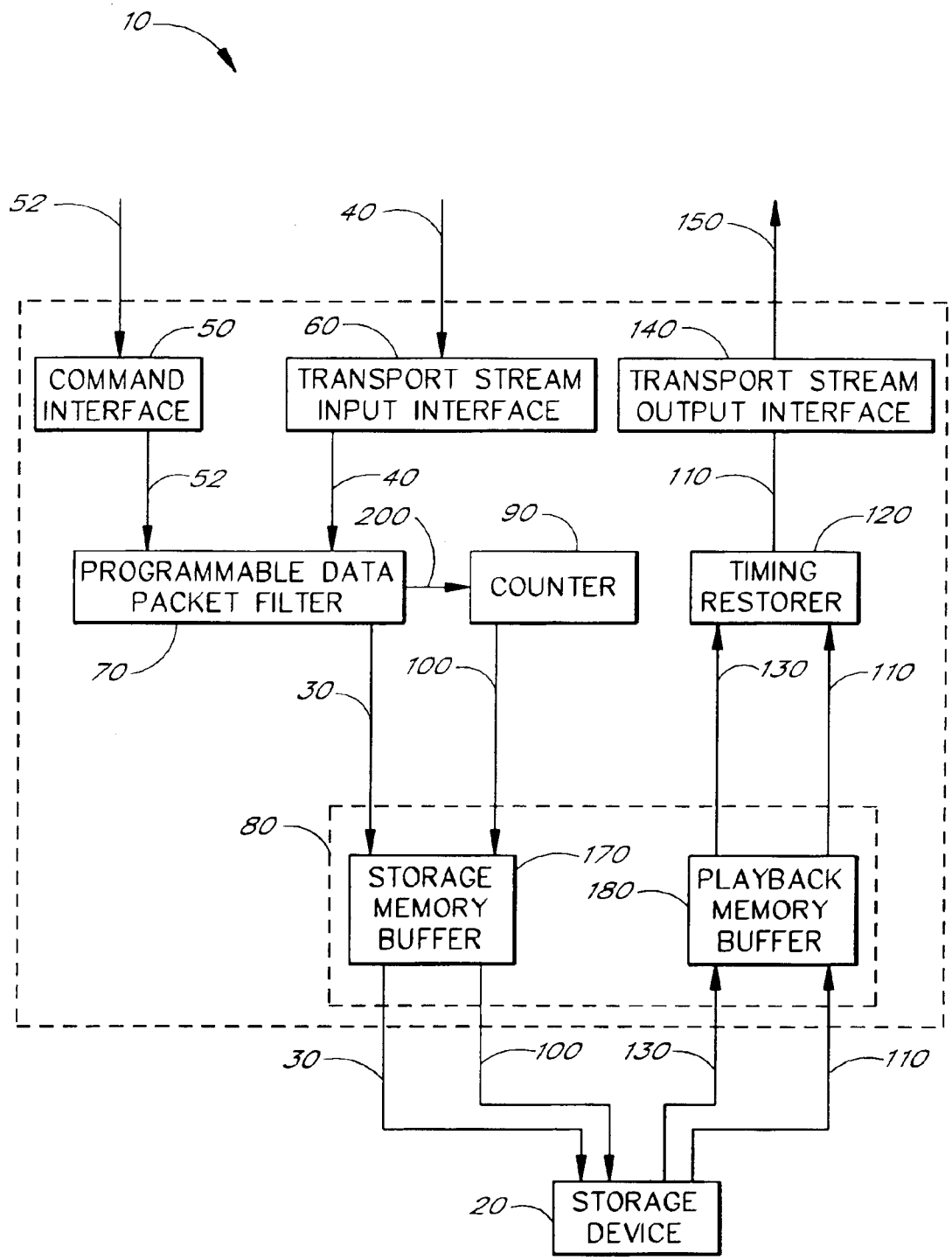
FIG. 6 schematically illustrates a data stream control system in accordance with an embodiment of the present invention, in which the counter is coupled to the programmable data packet filter.

In embodiments in which the interpacket time intervals of the series of selected data packets 30 are completely filled with non-selected data packets, the data stream control system 10 schematically illustrated in FIG. 6 can be used. In this embodiment, the counter 90 is coupled to the programmable data packet filter 70, which detects non-selected data packets, i.e., those data packets which do not correspond to the selected video program segments, and transmits a series of signals 200 to the counter 90, each signal 200 denoting the detection of a non-selected data packet. By counting the number of such signals 200 preceding a selected data packet 30 since receiving a previously received selected data packet 30, the counter 90 can determine the time of reception of the selected data packet 30. The counter 90 then generates a counter value 100 which comprises a non-selected packet count associated with the selected data packet 30. For example, referring to FIG. 2, the AV1-2 selected data packet would be associated with a counter value of 3, which represents the number of non-selected data packets detected since the time of reception of the AV1-1 selected data packet, the AV1-3 selected data packet would be associated with a counter value of 2, which represents the number of non-selected data packets detected since the time of reception of the AV1-2 selected data packet, and so on.

Alternatively, in other embodiments, the programmable data packet filter 70 detects every data packet, both selected data packets 30 and non-selected data packets, and transmits a series of signals to the counter 90, each signal denoting the detection of a data packet. By generating a counter value 100 which corresponds to a continual count of the number of data packets, the counter 90 can express the time of reception for a selected data packet 30 as the ordinal number of the selected data packet 30 in the incoming data transport stream 40. For example, referring to FIG. 2, where the ordinal number of the AV1-1 selected data packet in the incoming data transport stream is $N_1$, the AV1-2 selected data packet would be associated with a counter value of $N_2=(N_1+4)$ which is the ordinal number of the AV1-2 selected data packet, the AV1-3 selected data packet would be associated with a counter value of $N_3=(N_1+7)$, which represents the ordinal number of the AV1-3 selected data packet, and so on. Similarly, in still other embodiments, the counter value 100 can express the time of reception of a selected data packet 30 as a difference of the ordinal numbers from two sequential selected data packets 30. In each of these embodiments, the counter 90 generates a counter value 100 which comprises a non-selected packet count associated with the selected data packet 30. The selected data packet 30 with its respective counter value 100 is then transmitted by the programmable data packet filter 70 and the counter 90 to the storage memory buffer 100. Note that embodiments which utilize the non-selected packet count as a measure of the time of reception would not provide an accurate measure of interpacket time intervals which are not fully filled with non-selected data packets, such as the time interval between the AV1-3 selected data packet and the AV1-4 selected data packet, as illustrated in FIG. 2.

To playback a stored series of selected data packets 110, the data stream control system 10 transmits the stored series of selected data packets 110 to the outgoing data transport stream 150. In the embodiment schematically illustrated in FIG. 7, the stored selected data packets 110 and the corresponding counter values 130 are transmitted by the storage device 20 to the playback memory buffer 180, which then transmits the stored selected data packets 110 and corresponding counter values 130 to the timing restorer 120. Alternatively, in other embodiments in which the counter values 130 are stored in another memory buffer or RAM, the storage interface 80 receives the counter values 130 from the memory buffer or RAM and transmits the counter values 130 to the timing restorer 120.

Figure 7:
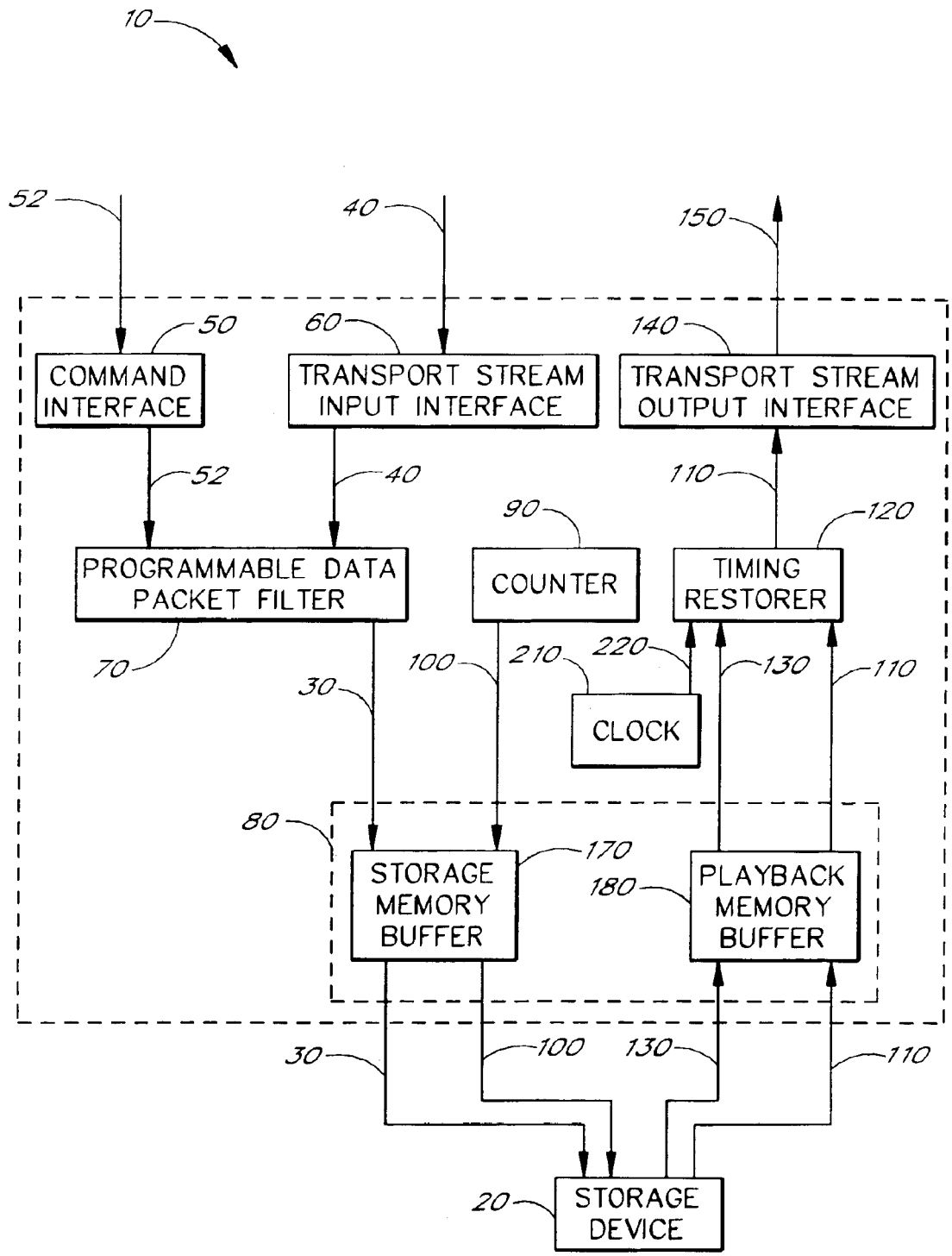
FIG. 7 schematically illustrates a data stream control system in accordance with an embodiment of the present invention, in which the timing restorer is synchronized to a clock that provides time information.

Upon receiving the stored selected data packet 110 with its corresponding counter value 130, the timing restorer 120 transmits the stored selected data packet 110 to the transport stream output interface 140 at a time of transmission responsive to the counter value 130 of the stored selected data packet 110. In embodiments in which the stored selected data packets 110 have been combined with the respective counter values 130, the timing restorer 120 can comprise a demultiplexer to separate the stored selected data packets 110 from the counter values 130. In certain embodiments, the timing restorer 120 is synchronized to a clock 210, which provides time information which is used to determine the time of transmission for the stored selected data packet 110. In certain embodiments of the present invention, the timing restorer 120 is synchronized to the same clock 160 to which the counter 90 is synchronized. In certain other embodiments, the timing restorer 120 can be synchronized to a different clock 210. The clock 210 illustrated in FIG. 7 is a separate component of the data stream control system 10; however, in other embodiments, the clock 210 can be a sub-component of the timing restorer 120, system controller, or other component of the data stream control system 10. In certain other embodiments, the clock 210 can be external to the data stream control system 10.

In embodiments in which the timing restorer 120 is synchronized to a clock 210, the time of transmission of a stored selected data packet 110 can be referenced to a reference time. By monitoring a clock value 220 from the clock 210, the timing restorer 120 can determine the appropriate time of transmission of the stored selected data packet 110 in response to the corresponding counter value 130. In certain embodiments, the time of transmission is determined in relation to an absolute reference time, which can be the time of a previous reset of the clock 210. Alternatively, in other embodiments utilizing a differential reference time, the reference time can be the time of transmission for an earlier stored selected data packet 130. For example, referring to the stored selected data packets 130 as illustrated in FIG. 5, where the time of transmission of the AV1-1 stored selected data packet was $\tau_1$, the time of transmission $\tau_2$ for the AV1-2 stored selected data packet would be $\tau_1+(t_2-t_1)$, the time of transmission $\tau_3$ for the AV1-3 stored selected data packet would be $\tau_1+(t_3-t_1)$, and so on. Similarly, if the counter value 130 of the stored selected data packet 110 represents the time of reception as the number of non-selected data packets or the ordinal number of the stored selected data packet, the timing restorer 120 can calculate the appropriate time of transmission and transmit the stored selected data packet 110 accordingly. Irrespective of the form in which the counter values 130 represent the times of reception, the stored series of selected data packets 110 are transmitted to the transport stream output interface 140 with interpacket time intervals which substantially match the corresponding interpacket time intervals of the series of selected data packets from the incoming data transport stream 40.

Figure 8:
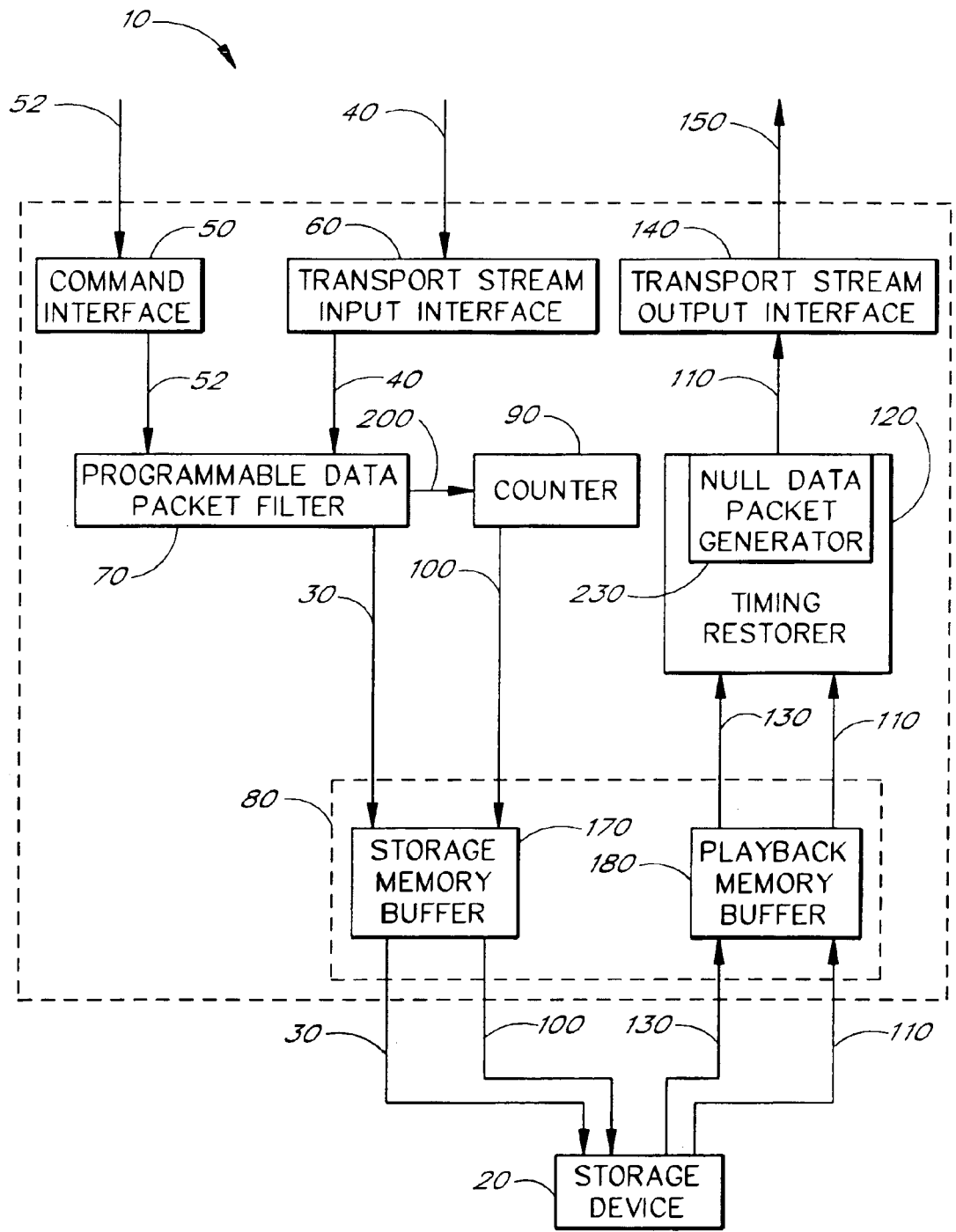
FIG. 8 schematically illustrates a data stream control system in accordance with an embodiment of the present invention, in which the timing restorer comprises a null data packet generator.

In certain other embodiments, such as that illustrated in FIG. 8, the timing restorer 120 interposes a number of null data packets between the stored selected data packet 110 and a previously transmitted stored selected data packet 110. The number of interposed null data packets is responsive to the counter value 130 of the stored selected data packet 110. In the embodiment schematically illustrated in FIG. 8, the timing restorer 120 comprises a null data packet generator 230 which produces null data packets in response to the counter values 130. In embodiments in which the counter value 130 represents the time of reception for a selected data packet as the number of non-selected data packets detected since receiving the immediately preceding selected data packet, the number of interposed null data packets between the corresponding stored selected data packets 110 equals the number of non-selected data packets. Alternatively, in embodiments in which the counter value 130 represents the times of reception as either absolute or differential clock values, the number of interposed null data packets is chosen to substantially match the interpacket time intervals for the corresponding series of selected data packets. Irrespective of the form in which the counter value 130 represents the times of reception, the stored series of selected data packets 110 are transmitted to the transport stream output interface 140 with interpacket time intervals which substantially match the corresponding interpacket time intervals of the series of selected data packets from the incoming data transport stream 40.

Figure 9:
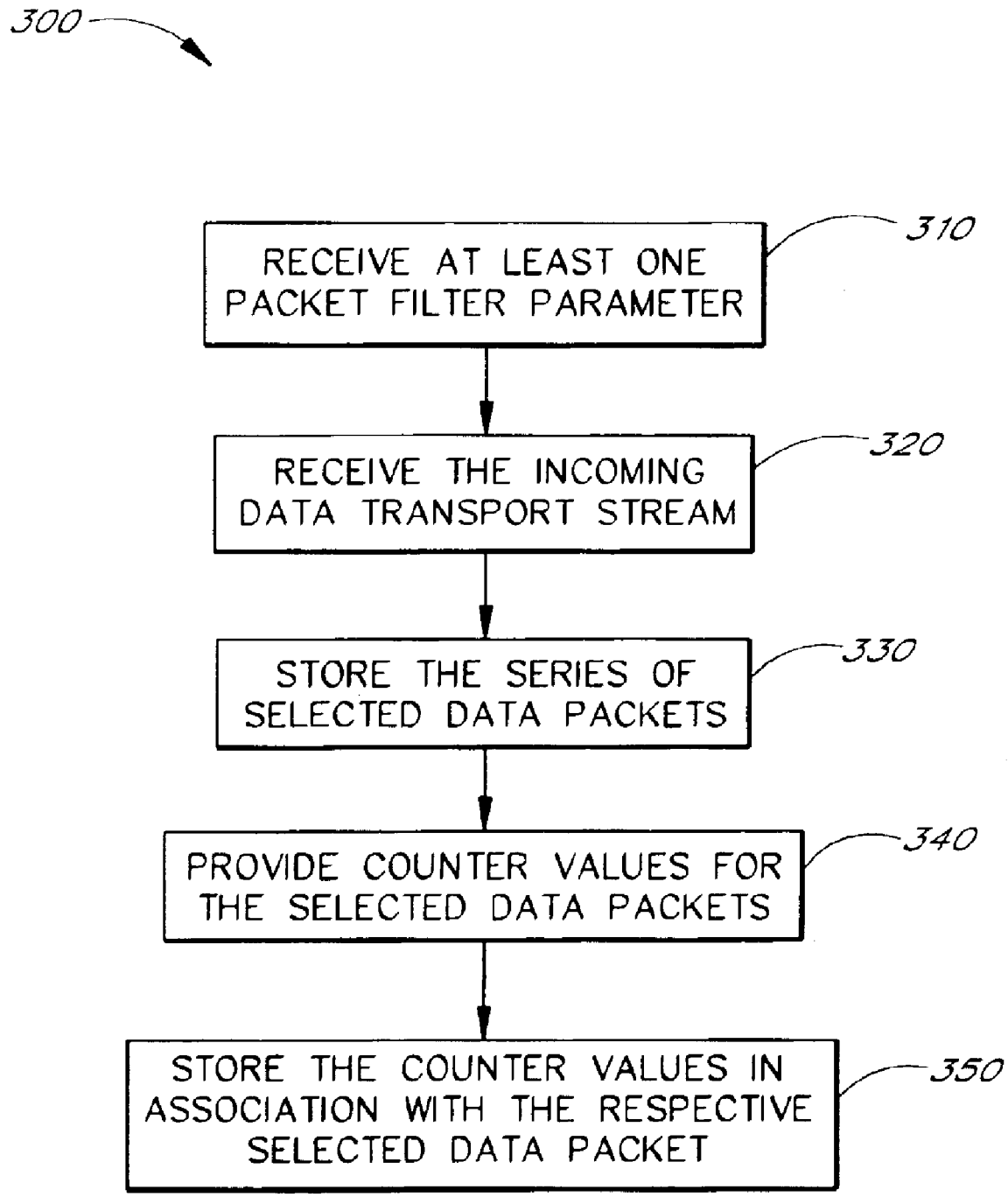
FIG. 9 is a flowchart which illustrates one embodiment of a method of selectively storing a series of selected data packets.

FIG. 9 is a flowchart which illustrates one embodiment of a method 300 of selectively storing a series of selected data packets 30 from an incoming data transport stream 40 comprising selected data packets 30 and non-selected data packets. The series of selected data packets 30 has interpacket time intervals between the selected data packets 30. The method 300 illustrated in FIG. 9 is discussed below primarily in reference to the embodiment of the data stream control system 10 schematically illustrated in FIG. 1. Persons skilled in the art appreciate that while the flowchart illustrated in FIG. 9 presents the procedural blocks in a particular sequence, other embodiments with other sequences of the procedural blocks are compatible with the present invention.

As shown in FIG. 9, the method 300 comprises a procedure block 310 which comprises receiving at least one packet filter parameter 52 identifying the series of selected data packets 30 corresponding to the video program segment selected for storing. As described above, the packet filter parameter 52 is typically generated by a system controller in response to user input and/or EPG information.

The method 300 further comprises a procedure block 320 which comprises receiving the incoming data transport stream 40. As described above, in certain embodiments, the incoming data transport stream 40 is generated by the video input interface in response to an external video data stream.

Alternatively in other embodiments, the incoming data transport stream 40 is generated by the system controller, or by some other device upstream of the data stream control system 10.

The method 300 further comprises a procedure block 330 which comprises storing the series of selected data packets 30 in response to the packet filter parameter 52 and the incoming data transport stream 40. As described above, the series of selected data packets 30 is stored on the storage device 20 by transmitting the selected data packets 30 from the programmable data packet filter 70 to the storage interface 80, and the storage interface 80 transmits the selected data packets 30 to the storage device 20. In certain embodiments, the selected data packets 30 are transmitted to the storage device 20 via a storage memory buffer 170.

The method 300 further comprises a procedure block 340 which comprises providing a counter value 100 for the selected data packets 30. Each counter value 100 represents a time of reception of the selected data packet 30. As described above, in certain embodiments, the counter value 100 for a selected data packet 30 corresponds to a time interval between the time of reception of the selected data packet 30 and a reference time. This reference time can represent a time of a previous reset of a clock, or a time of reception for an earlier selected data packet 30. In addition, in certain embodiments, the reference time can represent a time of reception for an immediately preceding selected data packet 30. Alternatively, in other embodiments, the time of reception of the selected data packet 30 can be expressed as a number of non-selected data packets between the selected data packets 30.

The method 300 further comprises a procedure block 350 which comprises storing the counter value 100 in association with the respective selected data packet 30. In this way, information regarding interpacket time intervals of the series of selected data packets 30 from the incoming data transport stream 40 is preserved. As described above, in certain embodiments, the counter values 100 are stored with the selected data packets 30 on the storage device 20. Alternatively, in other embodiments, the counter values 100 are stored elsewhere, but are indexed to be associated with the respective selected data packets 30.

Figure 10:
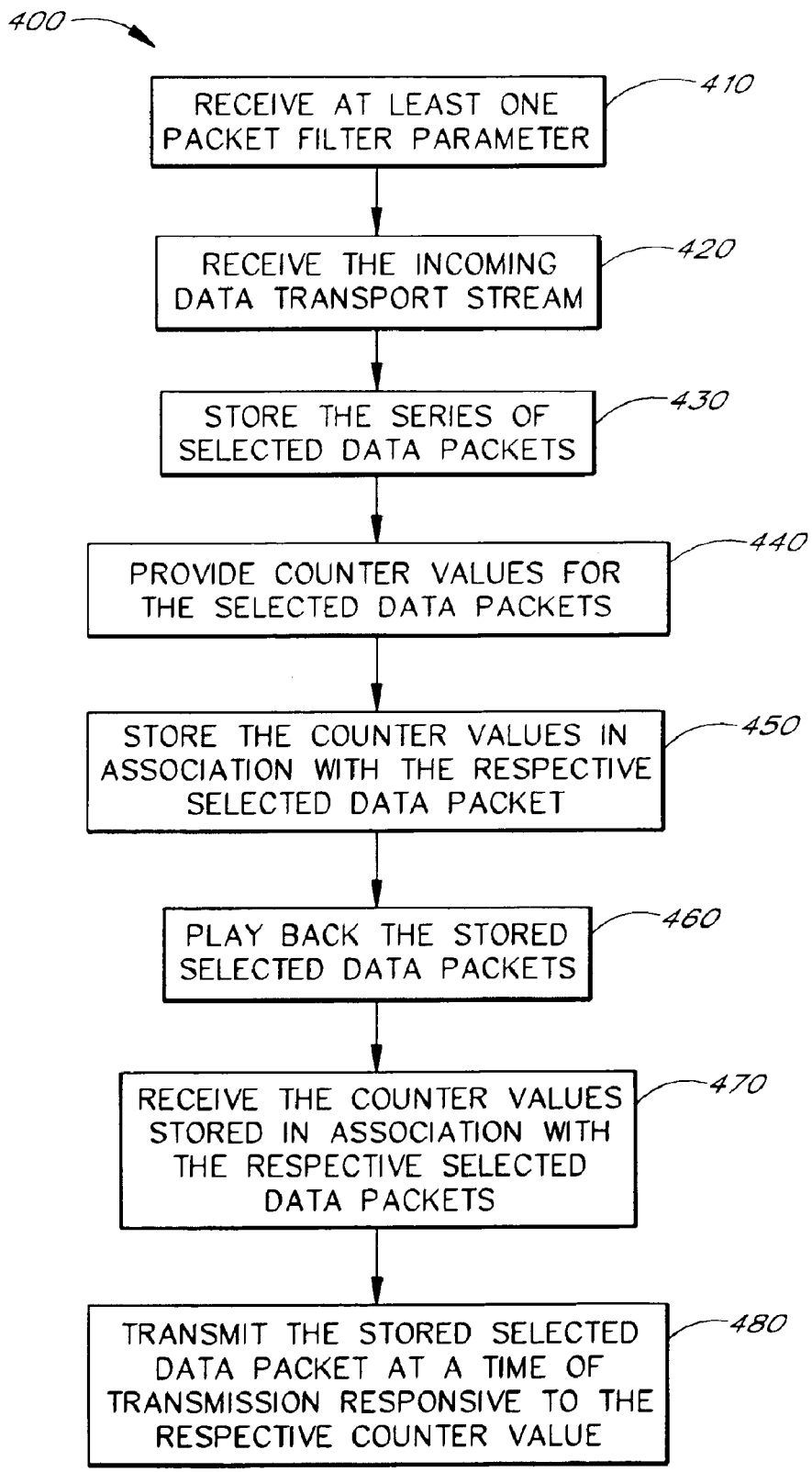
FIG. 10 is a flowchart which illustrates one embodiment of a method of selectively storing and playing back a stored series of selected data packets.

FIG. 10 is a flowchart which illustrates one embodiment of a method 400 of selectively storing and playing back a series of selected data packets 30 from an incoming data transport stream 40 comprising selected data packets 30 and non-selected data packets. The series of selected data packets 30 has interpacket time intervals between the selected data packets 30. The method 400 illustrated in FIG. 10 is discussed below primarily in reference to the embodiment of the data stream control system 10 schematically illustrated in FIG. 3. Persons skilled in the art appreciate that while the flowchart illustrated in FIG. 10 presents the procedural blocks in a particular sequence, other embodiments with other sequences of the procedural blocks are compatible with the present invention.

As shown in FIG. 10, the method 400 comprises a procedure block 410 which comprises receiving at least one packet filter parameter 52 identifying the series of selected data packets, a procedure block 420 which comprises receiving the incoming data transport stream 40, a procedure block 430 which comprises storing the series of selected data packets 30, a procedure block 440 which comprises providing a counter value 100 for the selected data packets 30, and a procedure block 450 which comprises storing the counter value 100 in association with the respective selected data packet 30. These procedure blocks 410, 420, 430, 440, and 450 mirror the procedure blocks 310, 320, 330, 340, and 350 described above and schematically illustrated in FIG. 9.

The method 400 further comprises a procedure block 460 which comprises playing back the stored selected data packets 110. As described above, to playback the stored series of selected data packets 110, the stored selected data packets 110 are transmitted from the storage device 20 to the storage interface 80. The storage interface 80 transmits the stored selected data packets 110 to the timing restorer 120. In certain embodiments, the stored selected data packets 110 are transmitted to the timing restorer 120 via a playback memory buffer 180.

The method 400 further comprises a procedure block 470 which comprises receiving the counter value 130 stored in association with the respective selected data packets 110. As described above, in certain embodiments which store the counter values 130 with the stored selected data packets 110 on the storage device 20, the counter values are transmitted from the storage device 20 to the timing restorer 120 via the storage interface 80. Alternatively, in embodiments in which the counter values 130 are stored elsewhere, but in association with the respective selected data packets 110, the counter values 130 are transmitted from the memory buffer or RAM from which they are stored via the storage interface 80 to the timing restorer 120.

The method 400 further comprises a procedure block 480 which comprises transmitting the stored selected data packet 110 at a time of transmission responsive to the respective counter value 130. As described above, the stored series of selected data packets 110 are transmitted with interpacket time intervals which substantially match the corresponding interpacket time intervals of the series of selected data packets from the incoming data transport stream 40.

What is claimed is:

1. A data stream control system connectable to a storage device, the data stream control system selectively storing a series of selected data packets from an incoming data transport stream, the data stream control system comprising:

a transport stream input interface that receives the incoming data transport stream comprising selected data packets having interpacket time intervals between the selected data packets;

a command interface that receives at least one packet filter parameter identifying the series of selected data packets;

a programmable data packet filter coupled to the command interface and transport stream input interface, the programmable data packet filter transmitting the series of selected data packets in response to the packet filter parameter and the incoming data transport stream;

a storage interface coupled to the programmable data packet filter and connectable to the storage device, the storage interface transmitting the selected data packets to the storage device; and a counter that provides counter values for the selected data packets, each counter value representing a time of reception of a respective selected data packet, whereby the counter value is stored in association with the respective selected data packet to preserve information regarding the interpacket time intervals of the series of selected data packets from the incoming data transport stream.

2. The data stream control system of claim 1, wherein the counter is synchronized to a clock that provides time information.

3. The data stream control system of claim 1, wherein the counter value for the respective selected data packet corresponds to a time interval between the time of reception of the respective selected data packet and a first reference time.

4. The data stream control system of claim 3, wherein the first reference time represents a time of reception of an earlier selected data packet.

5. The data stream control system of claim 1, wherein the time of reception of a respective selected data packet is a time at which the respective selected data packet is received by the programmable data packet filter.

6. The data stream control system of claim 1, wherein the counter is coupled to the programmable data packet filter which detects selected and non-selected data packets, and the counter value represents an ordinal number of the respective selected data packet in the incoming data transport stream.

7. The data stream control system of claim 1, wherein the counter is coupled to the programmable data packet filter which detects selected and non-selected data packets, and the counter value represents a number of non-selected data packets interposed between the respective selected data packet and a previously received selected data packet.

8. The data stream control system of claim 1, wherein the counter value is appended to the respective selected data packet and stored on the storage device.

9. The data stream control system of claim 1, wherein the counter value is stored at a memory location of a memory buffer, wherein the memory location for the counter value is indexed to the respective selected data packet.

10. The data stream control system of claim 1, wherein the storage interface receives stored selected data packets from the storage device, the storage device playing back and transmitting the stored series of selected data packets, the data stream control system further comprising:
 a timing restorer that receives the stored selected data packets from the storage interface and that receives the counter value stored in association with the respective selected data packets, the timing restorer transmitting the stored selected data packet at a time of transmission responsive to the respective counter value; and
 a transport stream output interface coupled to the timing restorer and an outgoing data transport stream, whereby the transport stream output interface receives the stored series of selected data packets from the timing restorer and transmits the stored series of selected data packets to the outgoing data transport stream, the stored series of selected data packets having interpacket time intervals which substantially match the corresponding interpacket time intervals of the series of selected data packets from the incoming data transport stream.

11. The data stream control system of claim 10, wherein the timing restorer is synchronized to a clock that provides time information.

12. The data stream control system of claim 11, wherein the counter is synchronized to the clock.

13. The data stream control system of claim 10, wherein the time of transmission is referenced from a second reference time.

14. The data stream control system of claim 13, wherein the second reference time represents a time of transmission of an earlier stored selected data packet.

15. The data stream control system of claim 10, wherein the timing restorer interposes a number of null data packets between the stored selected data packet and a previously transmitted stored selected data packet, the number of interposed null data packets being responsive to the respective counter value of the stored selected data packet.

16. The data stream control system of claim 1, wherein the selected data packets from the incoming data transport stream are encoded according to a selected compression standard.

17. The data stream control system of claim 16, wherein the selected compression standard is an MPEG compression standard.

18. The data stream control system of claim 1, wherein the selected data packet comprises a header with packet identification information.

19. The data stream control system of claim 1, wherein the storage device comprises an IDE hard disk drive.

20. The data stream control system of claim 1, wherein the interpacket time interval is defined as a time interval between a first time of reception of a first sync reference of a first selected data packet and a second time of reception of a second sync reference of a second selected data packet.

21. The data stream control system of claim 1, wherein the interpacket time interval is defined by a number of non-selected data packets interposed between a first selected data packet and a second selected data packet.

22. A data storage system that selectively stores a series of selected data packets from an incoming data transport stream and that plays back and transmits the stored series of selected data packets to an outgoing data transport stream, the data storage system comprising:
 a data storage system controller that generates at least one packet filter parameter in response to user input, the at least one packet filter parameter identifying the series of selected data packets;
 a transport stream input interface that receives the incoming data transport stream comprising selected data packets having interpacket time intervals between the selected data packets;
 a command interface that receives the at least one packet filter parameter from the data storage system controller;
 a programmable data packet filter coupled to the command interface and transport stream input interface, the programmable data packet filter transmitting the series of selected data packets in response to the packet filter parameter and the incoming data transport stream;
 a storage device that stores the selected data packets;
 a storage interface coupled to the programmable data packet filter and to the storage device, the storage interface transmitting the selected data packets to the storage device and receiving stored selected data packets from the storage device;
 a counter that provides counter values for the selected data packets, each counter value representing a time of reception of a respective selected data packet, whereby the counter value is stored in association with the respective selected data packet to preserve information regarding the interpacket time intervals of the series of selected data packets from the incoming data transport stream;
 a timing restorer that receives the stored selected data packets from the storage interface and that receives the counter values stored in association with the respective selected data packets, the timing restorer transmitting the stored selected data packet at a time of transmission responsive to the respective counter value; and
 a transport stream output interface coupled to the timing restorer and the outgoing data transport stream, whereby the transport stream output interface receives the stored series of selected data packets from the timing restorer, and the outgoing data transport stream receives the stored series of selected data packets from the transport Stream output interface with interpacket time intervals which substantially match the corresponding interpacket time intervals of the series of selected data packets from the incoming data transport stream.

23. The data storage system of claim 22, wherein the counter value for the respective selected data packet corresponds to a time interval between the time of reception of the respective selected data packet and a first reference time.

24. The data storage system of claim 23, wherein the first reference time represents a time of reception of an earlier selected data packet.

25. The data storage system of claim 22, wherein the time of reception of a respective selected data packet is a time at which the respective selected data packet is received by the programmable data packet filter.

26. The data storage system of claim 22, wherein the counter is coupled to the programmable data packet filter which detects selected and non-selected data packets, and the counter value represents an ordinal number of the respective selected data packet in the incoming data transport stream.

27. The data storage system of claim 22, wherein the counter is coupled o the programmable data packet filter which detects selected and non-selected data packets, and the counter value represents a number of non-selected data packets interposed between the respective selected data packet and a previously received selected data packet.

28. The data storage system of claim 22, wherein the counter value is appended to the respective selected data packet and stored on the storage device.

29. The data storage system of claim 22, wherein the counter value is stored at a memory location of a memory buffer, wherein the memory location for the counter value is indexed to the respective selected data packet.

30. The data storage system of claim 22, wherein the timing restorer is synchronized to a clock that provides time information.

31. The data storage system of claim 30, wherein the counter is synchronized to the clock.

32. The data storage system of claim 22, wherein the time of transmission is referenced from a second reference time.

33. The data storage system of claim 32, wherein the second reference time represents a time of transmission of an earlier stored selected data packet.

34. The data storage system of claim 22, wherein the timing restorer interposes a number of null data packets between the stored selected data packet and a previously transmitted stored selected data packet, the number of interposed null data packets being responsive to the respective counter value of the stored selected data packet.

35. The data storage system of claim 22, wherein the selected data packets from the incoming data transport stream are encoded according to a selected compression standard.

36. The data storage system of claim 35, wherein the selected compression standard is an MPEG compression standard.

37. The data storage system of claim 22, wherein the selected data packet comprises a header with packet identification information.

38. The data storage system of claim 22, wherein the storage device comprises an IDE hard disk drive.

39. The data storage system of claim 22, wherein an interpacket time interval is defined as a time interval between a first time of reception of a first sync reference of a first selected data packet and a second time of reception of a second sync reference of a second selected data packet.

40. The data storage system of claim 22, wherein an interpacket time interval is defined by a number of non-selected data packets interposed between a first selected data packet and a second selected data packet.

41. A method of selectively storing a series of selected data packets from an incoming data transport stream, the series of selected data packets having interpacket time intervals between the selected data packets, the method comprising:
  receiving at least one packet filter parameter identifying the series of selected data packets;
  receiving the incoming data transport stream;
  storing the series of selected data packets in response to the packet filter parameter and the incoming data transport stream;
  providing counter values for the selected data packets, each counter value representing a time of reception of a respective selected data packet; and
  storing the counter value in association with the respective selected data packet, thereby preserving information regarding the interpacket time intervals of the series of selected data packets from the incoming data transport stream.

42. The method of claim 41, wherein the counter value for the respective selected data packet corresponds to a time interval between the time of reception of the respective selected data packet and a first reference time.

43. The method of claim 42, wherein the first reference time represents a time of reception of an earlier selected data packet.

44. The method of claim 41, wherein the time of reception of a respective selected data packet is a time at which the respective selected data packet is received by the programmable data packet filter.

45. The method of claim 41, wherein the method further comprises calculating the counter value by counting a number of selected and non-selected data packets preceding the respective selected data packet.

46. The method of claim 41, wherein the method further comprises calculating the counter value by counting a number of non-selected data packets interposed between the respective selected data packet and a previously received selected data packet.

47. The method of claim 41, wherein storing the counter value comprises appending the counter value to the respective selected data packet and storing the counter value and the selected data packet on the storage device.

48. The method of claim 41, wherein storing the counter value comprises storing the counter value at a memory location of a memory buffer, wherein the memory location for the counter value is indexed to the respective selected data packet.

49. A method of selectively storing and playing back a series of selected data packets from an incoming data transport stream, the series of selected data packets having interpacket time intervals between the selected data packets, the method comprising:
  receiving at least one packet filter parameter identifying the series of selected data packets;
  receiving the incoming data transport stream;
  storing the series of selected data packets in response to the packet filter parameter and the incoming data transport stream;
  providing counter values for the selected data packets, each counter value representing a time of reception of a respective selected data packet;

storing the counter value in association with the respective selected data packet, thereby preserving information regarding the interpacket time intervals of the series of selected data packets from the incoming data transport stream;

playing back the stored selected data packets;

receiving the counter value stored in association with the respective selected data packets; and transmitting the stored selected data packet at a time of transmission responsive to the respective counter value, whereby the stored series of selected data packets are transmitted with interpacket time intervals which substantially match the corresponding interpacket time intervals of the series of selected data packets from the incoming data transport stream.

50. The method of claim 49, wherein the counter value for the respective selected data packet corresponds to a time interval between the time of reception of the respective selected data packet and a first reference time.

51. The method of claim 50, wherein the first reference time represents a time of reception of an earlier selected data packet.

52. The method of claim 49, wherein the time of reception of a respective selected data packet is a time at which the respective selected data packet is received by a programmable data packet filter.

53. The method of claim 49, wherein the method further comprises calculating the counter value by counting a number of selected and non-selected data packets preceding the respective selected data packet.

54. The method of claim 49, wherein the method further comprises calculating the counter value by counting a number of non-selected data packets interposed between the respective selected data packet and a previously received selected data packet.

55. The method of claim 49, wherein the time of transmission is referenced from a second reference time.

56. The method of claim 55, wherein the second reference time represents a time of transmission of an earlier stored selected data packet.

57. The method of claim 49, wherein the selected data packets from the incoming data transport stream are encoded according to a selected compression standard.

58. The method of claim 57, wherein the selected compression standard is an MPEG compression standard.

59. The method of claim 49, wherein the selected data packet comprises a header with packet identification information.

60. The method of claim 49, wherein the selected data packets are stored on a storage device comprising an IDE hard disk drive.

61. The method of claim 60, wherein storing the counter value comprises appending the counter value to the respective selected data packet and storing the counter value with the selected data packet on the storage device.

62. The method of claim 49, wherein storing the counter value comprises storing the counter value at a memory location of a memory buffer, wherein the memory location for the counter value is indexed to the respective selected data packet.

63. The method of claim 49, wherein an interpacket time interval is defined as a time interval between a first time of reception of a first sync reference of a first selected data packet and a second time of reception of a second sync reference of a second selected data packet.

64. The method of claim 49, wherein an interpacket time interval is defined by a number of non-selected data packets interposed between a first selected data packet and a second selected data packet.

* * * * *